US008667582B2

(12) United States Patent
Thomas et al.

(10) Patent No.: US 8,667,582 B2
(45) Date of Patent: Mar. 4, 2014

(54) SYSTEM, METHOD, AND COMPUTER PROGRAM PRODUCT FOR DIRECTING PREDETERMINED NETWORK TRAFFIC TO A HONEYPOT

(75) Inventors: Vinoo Thomas, Chennai (IN); Nitin Jyoti, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 889 days.

(21) Appl. No.: 11/953,774

(22) Filed: Dec. 10, 2007

(65) Prior Publication Data
US 2013/0242743 A1    Sep. 19, 2013

(51) Int. Cl.
*G06F 15/16*    (2006.01)
*G06F 12/14*    (2006.01)

(52) U.S. Cl.
USPC ............... 726/22; 726/11; 709/223; 709/224; 709/237; 709/238

(58) Field of Classification Search
USPC ................. 726/11, 12, 13, 14, 22, 23, 24, 25; 713/150, 151, 154; 709/223, 224, 238
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,117,533 B1 * | 10/2006 | Libenzi | 726/24 |
| 7,284,267 B1 * | 10/2007 | McArdle et al. | 726/11 |
| 7,506,155 B1 | 3/2009 | Stewart et al. | |
| 7,783,741 B2 * | 8/2010 | Hardt | 709/224 |
| 7,930,748 B1 * | 4/2011 | Futamura | 726/24 |
| 8,087,083 B1 * | 12/2011 | Norris | 726/24 |
| 2002/0046351 A1 * | 4/2002 | Takemori et al. | 713/201 |
| 2002/0188864 A1 * | 12/2002 | Jackson | 713/201 |
| 2003/0105819 A1 * | 6/2003 | Kim et al. | 709/205 |
| 2004/0003290 A1 * | 1/2004 | Malcolm | 713/201 |
| 2004/0078592 A1 * | 4/2004 | Fagone et al. | 713/201 |
| 2004/0111636 A1 * | 6/2004 | Baffes et al. | 713/201 |
| 2005/0033986 A1 * | 2/2005 | Ramarao et al. | 713/201 |
| 2005/0210534 A1 * | 9/2005 | Krishnamurthy | 726/23 |
| 2006/0101515 A1 * | 5/2006 | Amoroso et al. | 726/23 |
| 2006/0224677 A1 * | 10/2006 | Ishikawa et al. | 709/206 |
| 2006/0272014 A1 * | 11/2006 | McRae et al. | 726/12 |
| 2007/0133537 A1 * | 6/2007 | Oliver et al. | 370/392 |
| 2007/0157306 A1 * | 7/2007 | Elrod et al. | 726/14 |
| 2007/0157316 A1 * | 7/2007 | Devereux et al. | 726/24 |
| 2008/0086776 A1 * | 4/2008 | Tuvell et al. | 726/24 |
| 2008/0114843 A1 * | 5/2008 | Shinde et al. | 709/206 |
| 2008/0163354 A1 * | 7/2008 | Ben-Shalom et al. | 726/12 |

OTHER PUBLICATIONS

Klaus Steding-Jessen et al, "Using Low-Interaction Honeypots to Study the Abuse of Open Proxies to Send Spam", Dec. 4, 2007.*
Robert McGrew et al, "Experiences with honeypot systems: development, deployment, and analysis", pp. 1-9, IEEE, 2006.*

(Continued)

*Primary Examiner* — David Garcia Cervetti
*Assistant Examiner* — Shanto M Abedin
(74) *Attorney, Agent, or Firm* — Patent Capital Group

(57) ABSTRACT

A system, method, and computer program product are provided for directing predetermined network traffic to a honeypot. In use, predetermined network traffic originating from a node in a local area network and/or a virtual private network is identified. Further, the predetermined network traffic is directed to a honeypot.

14 Claims, 6 Drawing Sheets

(56) References Cited

OTHER PUBLICATIONS

V. Maheswari et al, "Honeypots: deployment and data forensic analysis", pp. 129-131, IEEE, 2007.*

Joel Spriggs et al, "Honeypots: Covert Network Security", pp. 162-170, Proceedings of the 2004 ASCUE Conference, www.ascue.org, 2004.*

Seltzer, "In-House Honeypots," eWeek Enterprise News & Reviewsl Oct. 14, 2007, ZiffDavis Enterprise Inc.*

Thomas et al., "The Need for an In-House SMTP Honeypot," Virus Bulletin, pp. 6- 7, Oct. 2007.*

Mauro Andreolini et al, "HoneySpam: Honeypots fighting spam at the source", pp. 77-83, USENIX Association, 2005.*

Iksu Kim et al, "The DecoyPort: Redirecting Hackers to Honeypots", pp. 59-68, Springer-Verlag Berlin Heidelberg, 2007.*

Leyden, "ORDB bids a long goodbye," The Register, Dec. 22, 2006.

Seltzer, "In-House Honeypots," eWeek Enterprise News & Reviews, Oct. 14, 2007, Ziff Davis Enterprise Inc.

Thomas, "Spread the word, not the virus!" McAfee Avert Labs Blog, Oct. 10, 2007, McAfee, Inc.

Thomas et al., "The Need for an In-House SMTP Honeypot," Virus Bulletin, pp. 6-7, Oct. 2007.

* cited by examiner

SYSTEM, METHOD, AND COMPUTER PROGRAM PRODUCT FOR DIRECTING PREDETERMINED NETWORK TRAFFIC TO A HONEYPOT

FIELD OF THE INVENTION

The present invention relates to network traffic, and more particularly to reacting to predetermined network traffic.

BACKGROUND

Security systems have traditionally been utilized for detecting predetermined (e.g. unwanted, etc.) data. For example, security systems are oftentimes in communication with a network for identifying and reacting to predetermined network traffic. However, techniques utilized by such traditional security systems for reacting to predetermined network traffic have generally exhibited various limitations.

Just by way of example, security systems have typically blocked outbound simple mail transfer protocol (SMTP) traffic on port 25 at a firewall in order to prevent computers on a local area network from sending unauthorized network traffic [e.g. unsolicited electronic mail (email) messages, etc.]. Such blocking technique has sometimes been used to mitigate the exposure of a compromised computer from sending unauthorized network traffic without the knowledge of a user of the compromised computer. However, by generally blocking the outbound SMTP traffic at the firewall, valuable data relating to the unauthorized network traffic, such as sources of such unauthorized network traffic has conventionally been less capable of being identified, analyzed, etc.

There is thus a need for addressing these and/or other issues associated with the prior art.

SUMMARY

A system, method, and computer program product are provided for directing predetermined network traffic to a honeypot. In use, predetermined network traffic originating from a node in a local area network and/or a virtual private network is identified. Further, the predetermined network traffic is directed to a honeypot.

DETAILED DESCRIPTION

Figure 1:
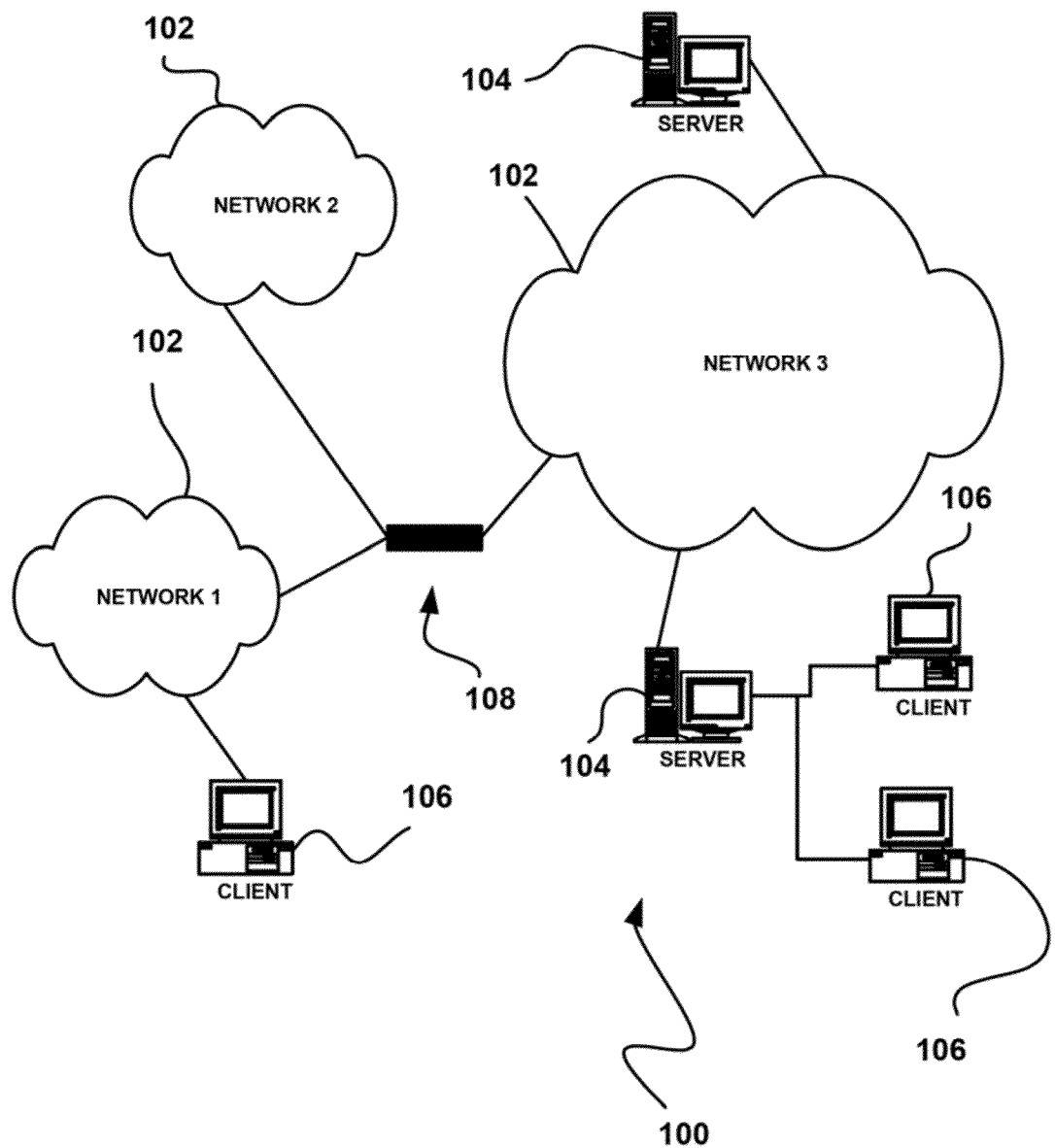
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
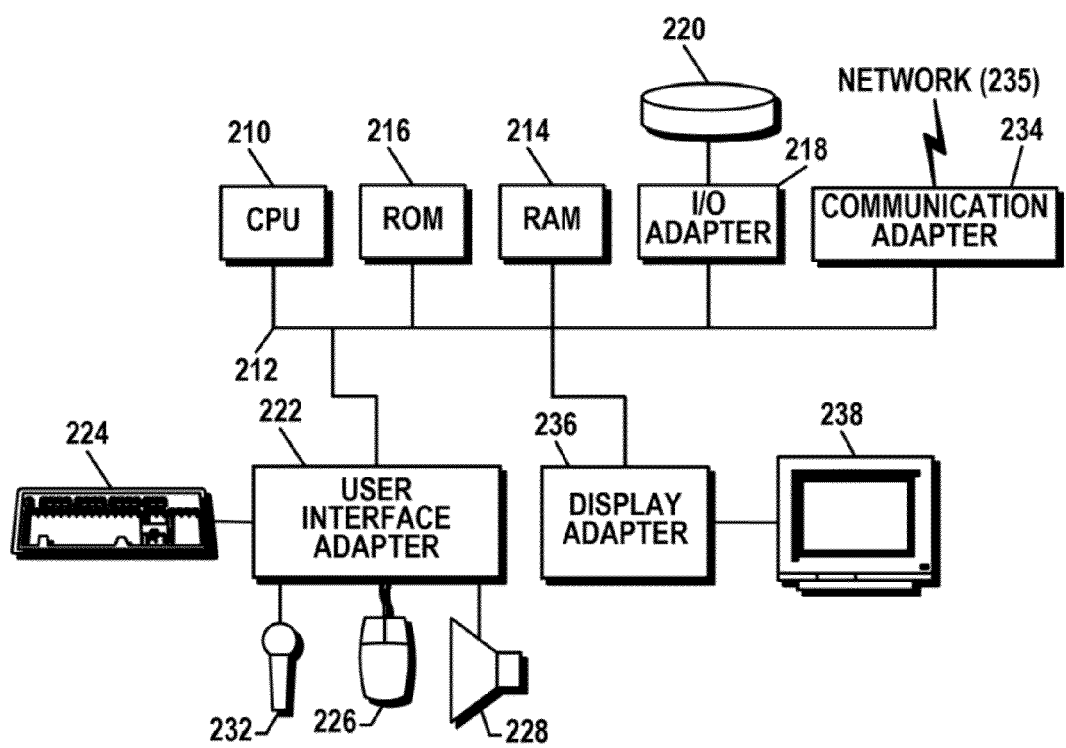
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
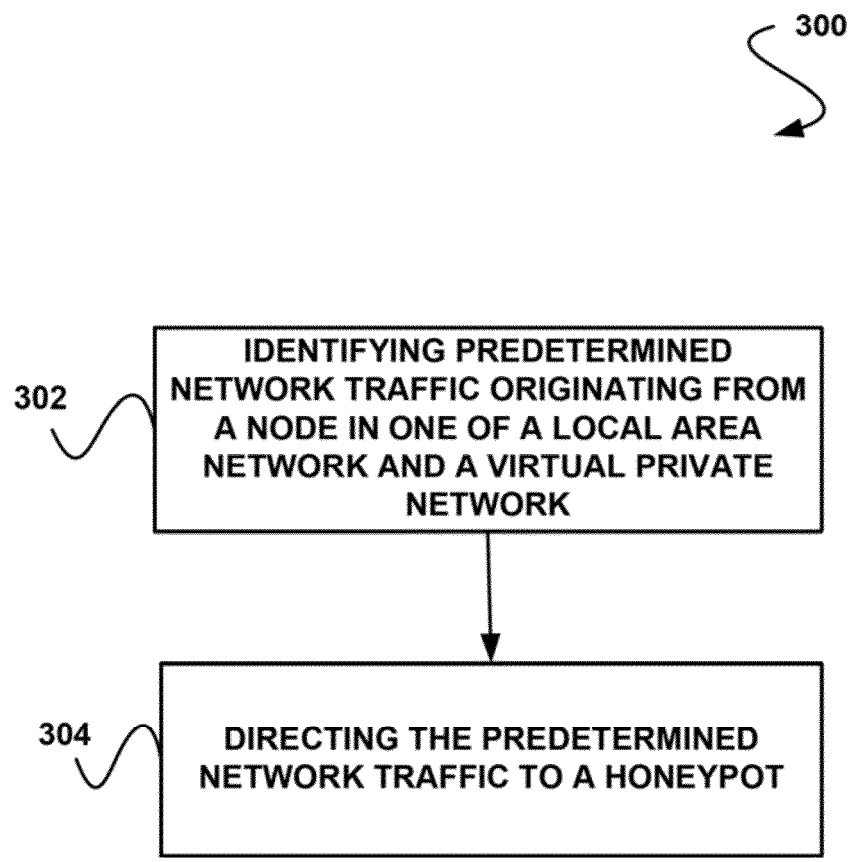
FIG. 3 illustrates a method for directing predetermined network traffic to a honeypot, in accordance with another embodiment.

FIG. 3 illustrates a method 300 for directing predetermined network traffic to a honeypot, in accordance with another embodiment. As an option, the method 300 may be carried out in the context of the architecture and environment of FIGS. 1 and/or 2. Of course, however, the method 300 may be carried out in any desired environment.

As shown in operation 302, predetermined network traffic originating from a node in a local area network (LAN) and/or a virtual private network (VPN) is identified. In the context of the present description, the predetermined network traffic may include any network traffic that has been predetermined and which originates from the node in the LAN or the VPN. In one embodiment, the network traffic may be predetermined based on predefined criteria (e.g. defined by a user, etc.). Further, as an option, the predefined criteria may include any aspect, characteristic, parameter, data, or information capable of being associated with the network traffic.

Just by way of example, the predefined criteria may indicate a particular a port from which network traffic is capable of originating. Thus, with respect to such example, if a port used by network traffic matches the predefined criteria indicating such particular port, it may be determined that the network traffic includes predetermined network traffic.

In one exemplary embodiment, the predetermined network traffic may include network traffic determined to be outbound simple mail transfer protocol (SMTP) traffic on port 25 or port 587. In another embodiment, the predetermined network traffic may include unauthorized network traffic. For example, such unauthorized network traffic may include unsolicited network traffic [e.g. unsolicited electronic mail (email) messages, etc.], network traffic associated with data leakage (e.g. including confidential information), network traffic that includes a mass mailer (e.g. a mass mailing email message), network traffic that includes harvested password information sent by a password stealing trojan, network traffic that included logged keystrokes from a compromised host, a malware infected email message, etc.

Additionally, in other embodiments, the predetermined network traffic may include packets, datagrams, messages, data, information, etc. Furthermore, in yet another embodiment, the predetermined network traffic may be associated with (e.g. use, etc.) a protocol. For example, the protocol may include SMTP, hypertext transfer protocol (HTTP), Internet message access protocol (IMAP), file transfer protocol (FTP), post office protocol version 3 (POP3), Internet relay chat (IRC), or any other protocol that may be associated with the predetermined network traffic.

Optionally, the predetermined network traffic may be associated with a particular port. Further, in another embodiment, the particular port may include a transmission control protocol (TCP) port or a user datagram protocol (UDP) port. Moreover, the particular port may include a SMTP port, a HTTP port, an IMAP port, or any other port capable of being associated with the predetermined network traffic. For example, the SMTP port may include TCP port 25 and/or TCP port 587.

In one embodiment, the node from which the predetermined network traffic originates may include any device, computer, processor, etc. in a LAN or a VPN. Just by way of example, the node may include any of the servers and/or the clients described above with respect to FIGS. 1 and/or 2. In one embodiment, the VPN may include any network tunneled through another network. Such tunneling may include encapsulating a network protocol within data transmitted by another network protocol, for example. As an option, the VPN may be associated with the LAN. For example, the LAN may include the VPN.

Moreover, in other embodiments, the predetermined network traffic may be identified via filtering, processing, etc. network traffic. For example, the predetermined network traffic may be identified by comparing network traffic to the predefined criteria described above. In yet another embodiment, a security device may identify the predetermined network traffic. For example, the security device may include a firewall, a packet filter, a router, a malware scanner, an email scanner, a network scanner, and/or any other device capable of identifying the predetermined network traffic. As an option, the security device may be located on, in communication with, etc. the LAN or the VPN for identifying the predetermined network traffic.

As an option, the security device may utilize at least one rule for identifying the predetermined network traffic. Such rule may include the predefined criteria, in one embodiment. As an example, the rule may include an instruction, command, directive, guideline, etc. Further, as yet another option, the rule may be stored in a data structure. In still yet another embodiment, the data structure may include a file, a list, a database, a hash, or any other structure that may be utilized for storing the rule.

Further, as shown in operation 304, the predetermined network traffic is directed to a honeypot. In the context of the present description, the honeypot may include any device, site (e.g. data site, network site, etc.), files, data records, unused Internet protocol (IP) address space, and/or anything else made accessible for the purpose of receiving the predetermined network traffic directed thereto for performing honeypot functions. Just by way of example, the honeypot may include any of the devices (e.g. client and/or servers) described above with respect to FIGS. 1 and/or 2.

In one embodiment, the honeypot may emulate (e.g. imitate, etc.) a system to which the predetermined network traffic was originally destined (e.g. prior to being directed to the honeypot). Optionally, the honeypot may emulate information, a resource, a service, etc. that is associated with the original destination of the predetermined network traffic. For example, the honeypot may include an email system capable of processing the predetermined network traffic, such as where the predetermined network traffic includes unsolicited email messages.

In yet another embodiment, the honeypot may be unprotected by a security system. As an option, the honeypot may reside on a network that is unprotected by the security system. For example, the unprotected network may include a demilitarized zone (DMZ), a demarcation zone, and/or perimeter network. In one embodiment, the security device utilized to identify the predetermined network traffic may direct the predetermined network traffic to the honeypot (e.g. based on the rule utilized to identify the predetermined network traffic, etc.). For example, the directing may include routing, re-routing, forwarding, etc. the predetermined network traffic from a destination to the honeypot.

To this end, the predetermined network traffic originating from a LAN or a VPN is directed to a honeypot. Optionally, the predetermined network traffic may be directed to the honeypot for analysis purposes. Such analysis may include identifying the node from which the predetermined network traffic originated, etc.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
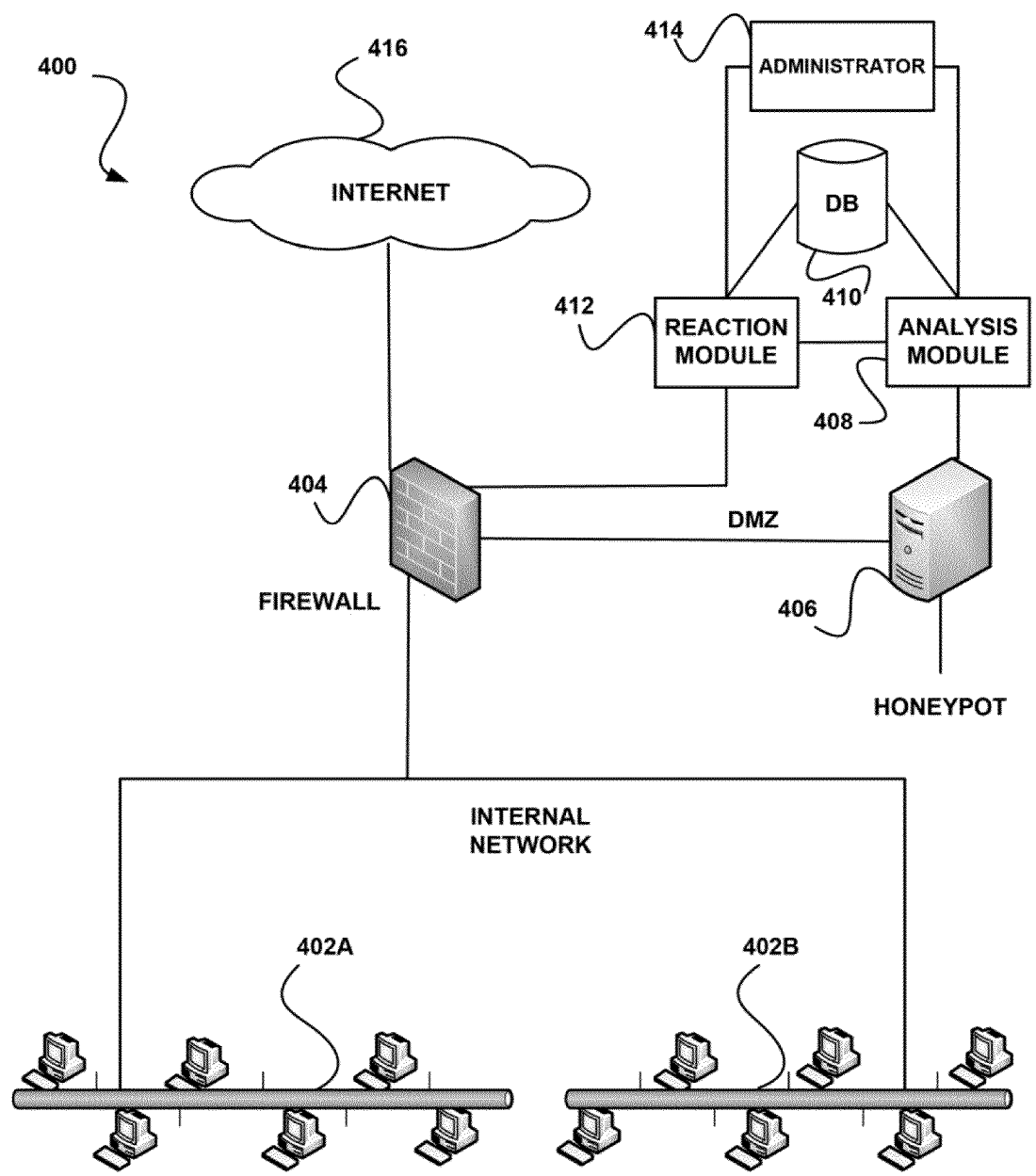
FIG. 4 illustrates a system for directing predetermined network traffic to a honeypot, in accordance with yet another embodiment.

FIG. 4 illustrates a system 400 for directing predetermined network traffic to a honeypot, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 includes a first set of nodes 402A and a second set of nodes 402B that are connected to an internal network. The internal network may include any network that is internal with respect to an entity (e.g. organization, company, etc.). In one embodiment, the first set of nodes 402A may be located in a LAN associated with the internal network (e.g. may utilize an IP address internal to the LAN, etc.). In another embodiment, the second set of nodes 402B may be located in a VPN associated with the internal network (e.g. may utilize an IP address internal to the VPN, etc.).

In addition, a firewall 404 is connected to the internal network. In one embodiment, the firewall 404 may process network traffic (e.g. a plurality of packets, etc.) communicated from the internal network and destined to a different network. For example, the different network may include any network external to the internal network, such as the Internet 416, etc. Optionally, the first set of nodes 402A and the second set of nodes 402B may communicate with other remote nodes, routers, devices, servers, clients, etc. in the different network via the firewall 404.

Further, the firewall 404 may process the network traffic in any desired manner. As an option, the processing may include filtering, inspecting, matching, etc. the network traffic with respect to predefined criteria included in one or more rules. The rules may be defined by an administrator device 414, for example. Furthermore, in still yet another embodiment, the processing may operate on a network level and/or application level of the network traffic. Optionally, the network level processing may include stateful and/or stateless processing of the network traffic.

Further, in one embodiment, the firewall 404 may identify characteristics of the network traffic during the processing. For example, the characteristics of the network traffic may include a source address, source port, destination address, destination port, protocol, type, state, flags, size, and/or any other information related to the network traffic. Optionally, the source address and/or destination address may include a media access control (MAC) address, an Internet protocol (IP) address, an address resolution protocol (ARP) address, etc.

Still, in yet another embodiment, the firewall 404 may utilize one or more rules for identifying the characteristics of the network traffic during the processing. In another embodiment, the rules may be stored in a table, in a database, in a file, in a hash, in memory, or in any other data structure capable of storing the rules. Optionally, the rules may be configured by the administrator device 414.

The firewall 404 may accordingly utilize such characteristics identified with respect to the network traffic for determining whether the network traffic includes predetermined network traffic. As an option, the predetermined network traffic may include any network traffic predetermined to be unauthorized, unwanted, undesirable, malicious, etc. Just by way of example, the firewall 404 may compare the characteristics of the network traffic to the predefined criteria, and a match between at least one of such characteristics to the predefined criteria may indicate that the network traffic includes predetermined network traffic originating from a node in the LAN or the VPN. In one embodiment, the predefined criteria may indicate SMTP network traffic on port 25 and/or port 587, such that the network traffic processed at the firewall 404 may be identified as predetermined network traffic if such network traffic includes SMTP network traffic on port 25 and/or port 587.

Furthermore, in one embodiment, the firewall 404 may direct predetermined network traffic to a honeypot 406. Thus, if the network traffic processed by the firewall 404 includes predetermined network traffic (e.g. matches the predefined criteria included in at least one rule, etc.), the network traffic may be directed to the honeypot 406. However, if the network traffic does not include predetermined network traffic, the network traffic may be allowed to be communicated to a destination designated by the network traffic (e.g. via the Internet 416, etc.).

To this end, and just by way of example, if a node from the first set of nodes 402A attempts to communicate with a device connected to the Internet 416, the firewall 404 may process the communicated network traffic utilizing at least one rule including the predefined criteria. Further, in the context of the present example, the firewall 404 may direct the network traffic to the honeypot 406 if the network traffic is identified as predetermined network traffic based on the processing. Table 1 illustrates an exemplary rule that may be utilized during the processing of the network traffic from the first set of nodes 402A and/or the second set of nodes 402B in order to determine whether the network traffic includes predetermined network traffic (i.e. network traffic on port 25 as shown) to be directed to the honeypot. It should be noted that such exemplary rule is set forth for illustrative purposes only, and thus should not be construed as limiting in any manner.

TABLE 1 iptables -t nat -A PREROUTING -i <interface id> -s <affected network address> -p tcp -dport 25 -j DNAT to <ip address of the honeypot>

Further, in one embodiment, the honeypot 406 may be coupled to the firewall 404. For example, the firewall 404 may be in communication with a DMZ on which the honeypot 406 is located. Of course, however, the firewall 404 may be in communication with the honeypot 406 indirectly, as another option. Moreover, the firewall 404 may direct the network traffic to the honeypot 406 in any desired manner. In one example, the firewall 404 may direct the network traffic to port 25 of the honeypot 406.

Thus, the honeypot 406 may receive predetermined network traffic from the firewall 404. Optionally, the honeypot 406 may be capable of emulating a SMTP service for receiving SMTP network traffic on port 25. Further, as an option, the honeypot 406 may listen for network traffic on a single port or a plurality of ports (e.g. TCP port 25 and/or TCP port 587). Additionally, as yet another option, the honeypot 406 may display a custom server banner for the received predetermined network traffic.

Still yet, the honeypot 406 may process the predetermined network traffic. As an option, the honeypot 406 may determine attributes associated with the predetermined network traffic. For example, the attributes associated with the predetermined network traffic may include time and/or date connected, destination address, source address, recipient email address, source email address, message subject, message body, attachment, message size, message headers, and/or any other attribute associated with the predetermined network traffic. Furthermore, in still yet another embodiment, the honeypot 406 may store the predetermined network traffic and/or the attributes thereof as at least one record. For example, each record may include an email message, a database record, a text file, at least one of the attributes associated with the predetermined network traffic, etc. Optionally, the records may be stored in a file, a database, a hash, or any other data structure capable of storing the records associated with the predetermined network traffic in the honeypot 406. In one embodiment, a name of the file may include at least one attribute of the predetermined network traffic, a hash of at least one attribute of the predetermined network traffic, and/or any unique file name.

Additionally, an analysis module 408 is coupled to the honeypot 406. As an option, the analysis module 408 may also be coupled to the firewall 404, a reaction module 412, a database 410, and/or an administrator device 414. Further, it should be noted that the analysis module 408, reaction module 412, and/or database 410 may be included in a separate device or may be integrated with the firewall 404, the honeypot 406, and/or the administrator device 414. In yet another embodiment, the analysis module 408 may store the records stored in the honeypot 406 into the database 410. For example, the stored records of the honeypot 406 may be loaded as a plurality of database records into the database 410. As an option, the analysis module 408 may load new records stored on the honeypot 406 into the database 410 in response to the honeypot 406 processing predetermined network traffic.

Further, in yet another embodiment, the analysis module 408 may analyze the records stored by the honeypot 406 and/or the records stored in database 410. Optionally, the analysis may include categorizing each of the records as a specific type of unwanted network traffic (e.g. malware, virus, mass mailer, password stealer, etc.) and/or as unwanted network traffic that utilizes email as a vector. For example, the unwanted network traffic may be determined to be an email including a malware attachment, an email including a trojan, an email including a backdoor, an email including a password stealer, an email sent by a mass mailer, an unsolicited email, a legitimate email, etc. based on the analysis.

In other various embodiments, the analysis may include determining that a number of records exceed a threshold, identifying a predetermined attachment associated with at least one record, identifying a node from which predetermined network traffic associated with at least one record originated, identifying at least one record as including at least one predetermined value, identifying a type of predetermined network traffic associated with at least one record, etc. Furthermore, in another embodiment, the analysis module 408 may perform risk management based on the records. For example, the analysis module 408 may determine a number of nodes affected with unwanted data (e.g. virus, etc.) and/or that communicated the predetermined unwanted network traffic, an associated duration that each node was affected, time a node was initially affected, etc.

Still yet, in yet another embodiment, the analysis module 408 may trigger an action using the reaction module 412, based on the analysis. As an option, the reaction module 412 may receive an indication from the analysis module 408 after the analysis module 408 determines that the at least one record meets a predetermined set of criteria indicated in a rule (e.g. stored in the database 410, configured by the administrator device 414, etc.). Further, in the context of the present embodiment, the indication may include any of the attributes associated with the predetermined network traffic. For example, the reaction module 412 may receive an indication that a particular node may be infected with malware based on the analysis of a record by the analysis module 408. Optionally, in response to the indication, the reaction module 408 may perform an action.

In one embodiment, the action may be predetermined, based on the indication from the analysis module 408, based on the attributes associated with the predetermined network traffic, and/or based on any record used in the analysis. As an option, the action may include alerting an administrator, configuring the firewall 404, performing further analysis on the record, performing a risk assessment of the internal network, etc. For example, alerting the administrator may include sending a message, an email, an event, etc. to an administrator of the administrator device 414. Further, configuring the firewall 404 may include adding, modifying, updating, and/or deleting at least one of the rules utilized by the firewall 404 for processing network traffic. Just by way of example, after receiving an indication from the analysis module 408 that a particular node from which predetermined network traffic originated may be infected with malware, the reaction module 412 may add a new rule to the firewall 404. To this end, the firewall 404 may receive an update including a new rule based on the analysis of the predetermined network traffic. The new rule may prevent the particular node from communicating through the firewall 404 (e.g. by blocking communications originating from an internet protocol address associated with such node, etc.).

In still yet another embodiment, the further analysis performed by the reaction module 412 may include transmitting an attachment associated with the predetermined network traffic directed to the honeypot 406 to the administrator device 414 and/or an antivirus vendor for analysis purposes, such as malware scanning, reverse engineering, inspecting, processing, examining, antivirus signature generation, etc. Still yet, performing the risk assessment of the internal network may include generating a report based on records in the database 410. Further, the report may include a number of nodes infected with malware, IP addresses blocked at the firewall 404, malware detected, etc.

Further, in another embodiment, the administrator device 414 may be utilized to configure parameters associated with the analysis module 408 and/or the reaction module 412. As an option, the parameters associated with the analysis module 408 may include any rules capable of being utilized by the analysis module 408 for the analysis of records associated with predetermined network traffic directed to the honeypot 406. In yet another embodiment, the parameters associated with the reaction module 412 may include rules capable of being utilized by the reaction module 412 for performing the action.

Figure 5:
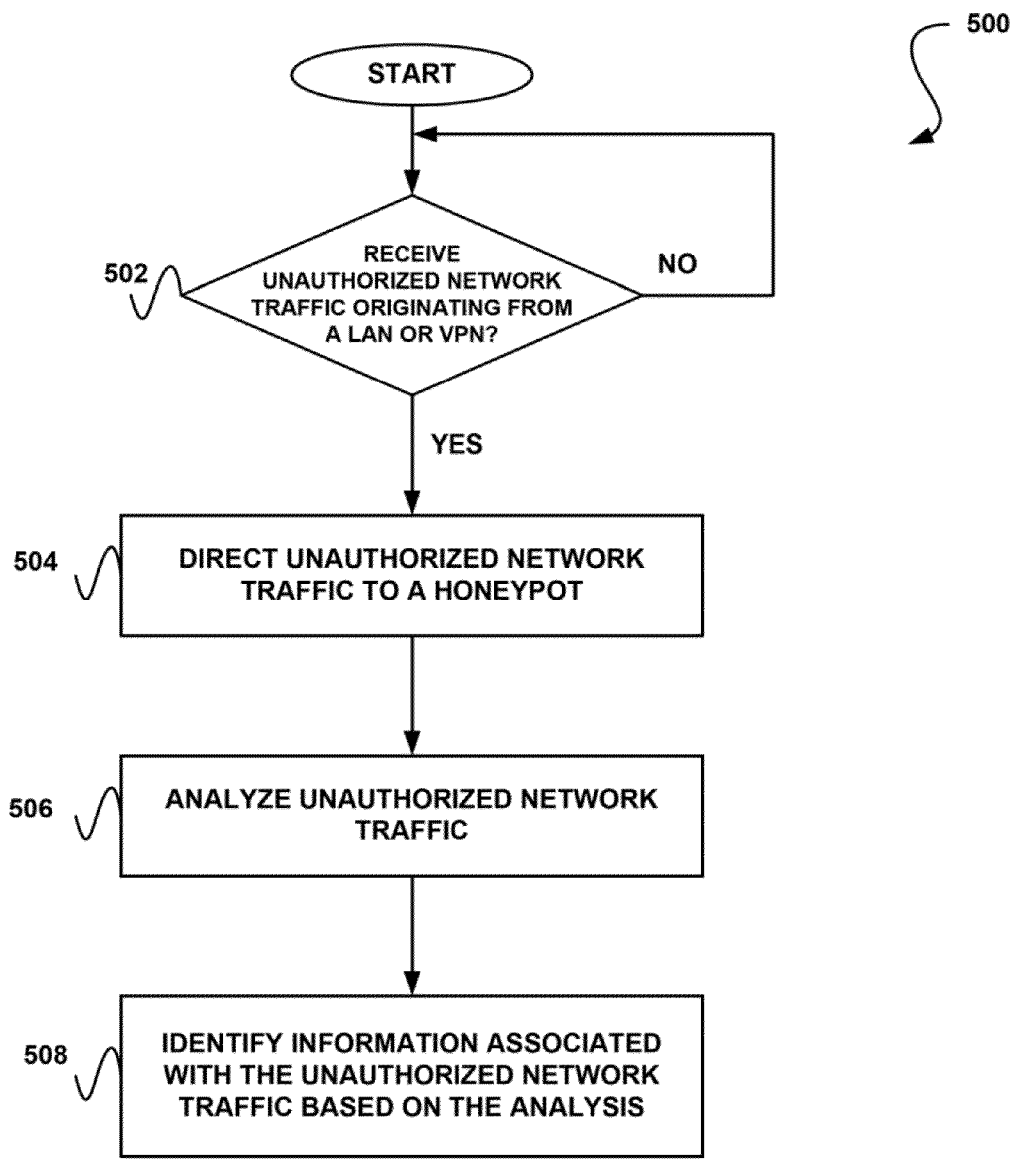
FIG. 5 illustrates a method for analyzing unauthorized network traffic directed to a honeypot, in accordance with still yet another embodiment.

FIG. 5 illustrates a method 500 for analyzing unauthorized network traffic directed to a honeypot, in accordance with still yet another embodiment. As an option, the method 500 may be carried out in the context of the architecture and environment of FIGS. 1-4. For example, the method 500 may be carried out utilized the firewall 404 and/or analysis module 408 of FIG. 4. Of course, however, the method 500 may be carried out in any desired environment. Again, it should be noted that the aforementioned definitions may apply during the present description.

As shown in decision 502, it is determined whether unauthorized network traffic originating from a node in a LAN or a VPN is received. Such determination may be made utilizing the firewall 404 of FIG. 4, for example. As an option, network traffic communicated from the LAN or VPN may be filtered for identifying the unauthorized network traffic.

In one embodiment, a rule may be utilized in order to identify the unauthorized network traffic. For example, the rule may indicate which network traffic includes unauthorized network traffic (e.g. the rule may indicate characteristics of unauthorized network traffic, etc.) Optionally, the unauthorized network traffic may include SMTP traffic destined for port 25. For example, an application executing on the node connected to the LAN or the VPN may communicate unauthorized network traffic destined for port 25. In one embodiment, the application executing on the node may include a mass mailer, a trojan, a backdoor, a keylogger, a password stealer, etc, or any other application communicating the unauthorized network traffic.

Further, in response to a determination that the unauthorized network traffic has been received, the unauthorized network traffic is directed to a honeypot, as shown in operation 504. Thus, as an option, after identifying the unauthorized network traffic, the firewall may direct the unauthorized network traffic to the honeypot. For example, the unauthorized network traffic may be redirected from a source originally indicated by the network traffic to the honeypot. In one embodiment, a rule may be utilized to direct the unauthorized network traffic to the honeypot. As an option, the rule to direct the unauthorized network traffic to the honeypot may be a portion of the rule used to identify the unauthorized network traffic.

To this end, the honeypot may be capable of receiving the unauthorized network traffic. In one embodiment, the honeypot may process the unauthorized network traffic in order to construct an email message associated with unauthorized network traffic. As an option, the honeypot may store the email message constructed from unauthorized network traffic.

Additionally, as shown in operation 506, the unauthorized network traffic is analyzed. Optionally, the analysis module 408 of FIG. 4 may analyze the unauthorized network traffic. In one embodiment, the analysis may determine characteristics of the unauthorized network traffic. For example, the characteristics of the unauthorized network traffic may include time received, date received, destination IP address, source IP address, recipient email address, source email address, message subject, message body, attachment, message size, message headers, and/or any other attribute associated with the unauthorized network traffic. Furthermore, in yet another embodiment, the analysis may determine that the unauthorized network traffic belongs to a particular category. In various examples, the particular category may include a trojan email, a mass mailer, spam, malware, or other category capable of being associated with unauthorized network traffic. To this end, the analysis may include scanning the unauthorized network traffic, etc. In the context of the current example, the trojan email may include an email indicating that the node from which the unauthorized network traffic originated may be compromised by a trojan.

Furthermore, information associated with the unauthorized network traffic is identified based on the analysis, as shown in operation 508. In one embodiment, the information may indicate the node that transmitted the unauthorized network traffic. For example, the node may be indicated using an IP address, a node specific email address, or any other information associated with such node. As an option, the node may be configured with the node specific email address. In one embodiment, the node specific email address may be configured in an address book on the node when the node is provisioned, maintained, installed, upgraded, etc. Optionally, the node specific email address may be stored in a database. Furthermore, in yet another embodiment, if the information associated with the unauthorized network traffic includes the node specific email address, then the analysis may be able to identify the node that transmitted the unauthorized network traffic based on the node specific email address. For example, if malware scans the address book on the node in order to locate valid email addresses that may be used in sending spam, mass mailing, an/or malware related email messages, the malware may identify the node specific email address. Further, the malware may communicate predetermined network traffic to the node specific email address, which may indicate that the node including the address book with such particular node specific email address includes the malware.

Of course, it should be noted that any information associated with the unauthorized network traffic may be identified based on the analysis. Further, the information may be identified for any desired purpose. Just by way of example, the information may be utilized for generating a report, issuing an alert, updating rules, identifying data leakage, etc.

Figure 6:
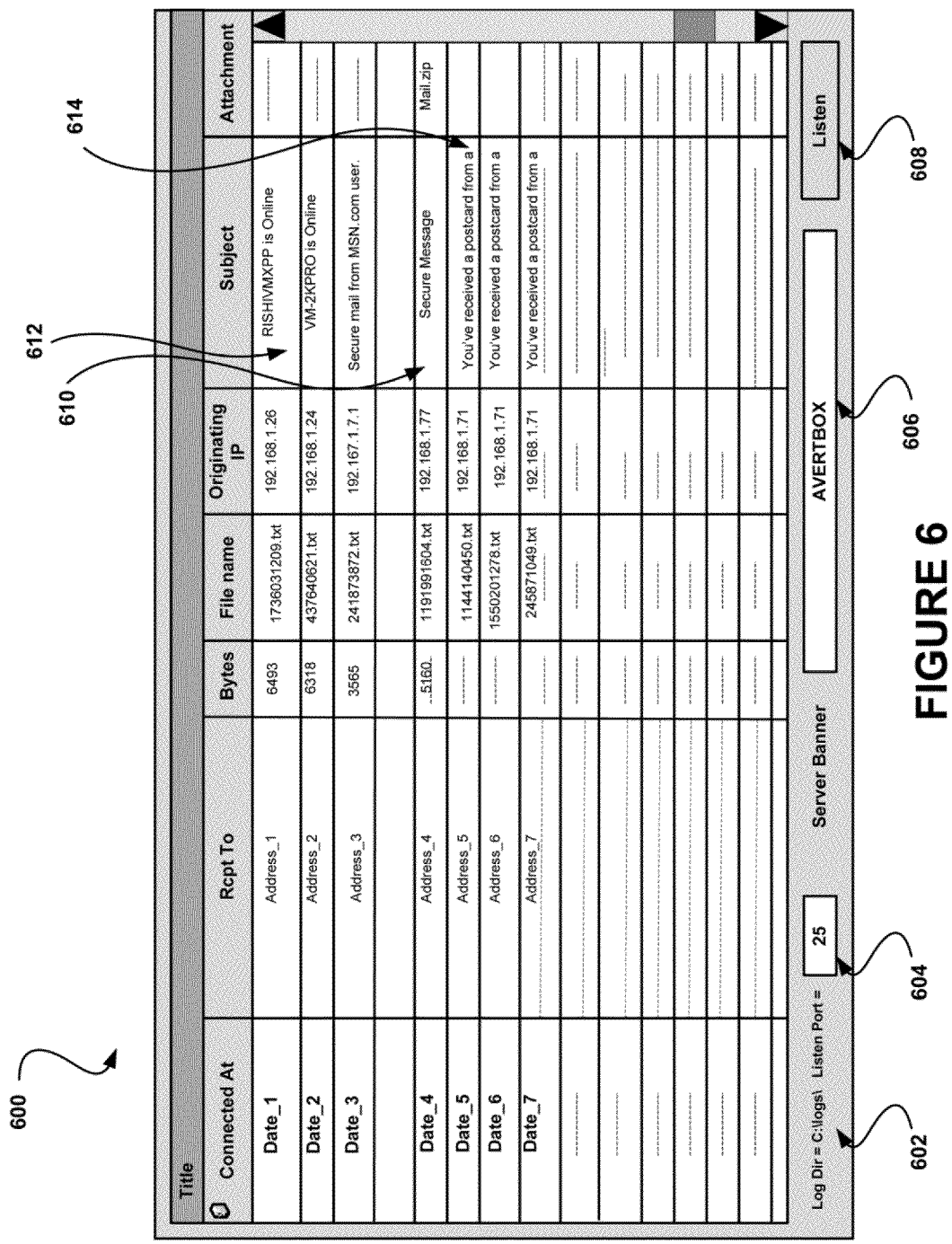
FIG. 6 illustrates a graphical user interface for displaying information associated with predetermined network traffic directed to a honeypot, in accordance with another embodiment.

FIG. 6 illustrates a graphical user interface 600 for displaying information associated with predetermined network traffic directed to a honeypot, in accordance with another embodiment. As an option, the graphical user interface 600 may be implemented in the context of the architecture and environment of FIGS. 1-5. Just by way of example, the graphical user interface 600 may be implemented utilizing a display of the administrator device 414 of FIG. 4. Of course, however, the graphical user interface 600 may be implemented in any desired environment. Yet again, it should be noted that the aforementioned definitions may apply during the present description.

In one embodiment, the graphical user interface (GUI) 600 may include a window for displaying information relating to unauthorized network traffic. Furthermore, in another embodiment, the window may be utilized for interacting with a honeypot (e.g. for identifying the unauthorized network traffic received by the honeypot, etc.). In the context of the present embodiment, the honeypot may include a mailpot utilized for receiving unauthorized email messages. Thus, the GUI 600 may display information relating to unauthorized email messages received by the mailpot.

The GUI 600 may be displayed on any desired device capable of displaying the GUI 600. For example, the GUI 600 may be displayed on an administrator device (e.g. such as the administrator device 414 of FIG. 4). In addition, the GUI 600 may be populated via reaction module capable of generating a report associated with unauthorized network traffic that has been received by a honeypot (e.g. such as the reaction module 412 of FIG. 4). In this way, a user (e.g. administrator) may view information associated with predetermined network traffic directed to a honeypot.

As shown, the GUI 600 includes a plurality of fields associated with unauthorized network traffic. The fields may include date and time connected, recipient address (e.g. rcpt to), size of the unauthorized network traffic (e.g. bytes), a unique filename for the stored unauthorized network traffic, a remote IP address associated with a node that transmitted the unauthorized network traffic, a subject of the unauthorized network traffic, an attachment of the unauthorized network traffic, and/or any other information associated with the unauthorized network traffic. As an option, the plurality of fields may be displayed in a grid (e.g. as a table, etc.).

As also shown, a plurality of different records may be displayed utilizing the fields. Each record may be associated with a different instance of unauthorized network traffic. To this end, the GUI 600 may display information associated with different types of unauthorized network traffic. In various exemplary embodiments, a record may be associated with a trojan email message 612, a record may be associated with a mass mailer 610, an a record may be associated with an unsolicited email 614, etc.

Additionally, in still yet another embodiment, the GUI 600 may indicate a location 602 in which the unauthorized network traffic is stored. Optionally, the location may include a location on a storage device (e.g. directory). Furthermore, the GUI 600 may include a port number field 604 indicating a port number to which the unauthorized network traffic is destined. Thus, records associated with unauthorized network traffic displayed via the GUI 600 may represent network traffic on the port number indicated by the port number field 604. Optionally, a port number may be input into the port number field 604 by a user. Thus, the records displayed via the GUI 600 may dynamically change to reflect unauthorized network traffic associated with the port number input into the port number field 604.

In another embodiment, the GUI 600 includes a banner field 606. Optionally, the banner field 606 may indicate the banner (e.g. server banner, etc.) to display upon a new connection to a honeypot. For example, the new connection may be initiated by the honeypot accepting the unauthorized network traffic directed to the honeypot by a security device.

Still, in yet another embodiment, the GUI 600 may include a listen button 608. As an option, the listen button may instruct the honeypot to begin waiting for new connections associated with the unauthorized network traffic. In addition, as another option, the listen button may instruct the honeypot to stop waiting for new connections associated with the unauthorized network traffic.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    identifying, by a firewall in communication with a honeypot, predetermined network traffic originating from a node in one of a local area network and a virtual private network utilizing at least one rule for identifying the predetermined network traffic, wherein characteristics of the predefined network traffic match predefined criteria associated with unauthorized network traffic, and wherein the predefined criteria includes the unauthorized network traffic including confidential information not authorized for communication from the node;
    directing, by the firewall, the predetermined network traffic to the honeypot;
    analyzing the predetermined network traffic directed to the honeypot; and
    receiving, by the firewall, an update of the at least one rule based on the analysis of the predetermined network traffic directed to the honeypot.

2. The method of claim 1, wherein the predetermined network traffic includes simple mail transfer protocol traffic (SMTP).

3. The method of claim 2, wherein the simple mail transfer protocol traffic includes outbound traffic on port 25 or port 587.

4. The method of claim 1, wherein the predetermined network traffic includes the unauthorized network traffic.

5. The method of claim 1, wherein the node utilizes an internet protocol address internal to the local area network.

6. The method of claim 1, wherein a node specific email address is configured on the node.

7. The method of claim 1, wherein the at least one rule is utilized by the firewall for the directing.

8. The method of claim 1, wherein the directing includes redirecting the predetermined network traffic from a destination to the honeypot.

9. The method of claim 1, wherein the honeypot includes a server.

10. The method of claim 1, wherein the honeypot resides on a network unprotected by a security device.

11. The method of claim 1, wherein the predetermined network traffic includes at least one of an unsolicited electronic mail message, a mass mailing electronic mail message, and a malware infected electronic mail message.

12. The method of claim 1, wherein the update of the least one rule includes adding a rule to block network traffic originating from an internet protocol address associated with the node.

13. A computer program product embodied on a non-transitory computer readable medium for performing operations, comprising:
    identifying, by a firewall in communication with a honeypot, predetermined network traffic originating from a node in one of a local area network and a virtual private network utilizing at least one rule for identifying the predetermined network traffic, wherein characteristics of the predefined network traffic match predefined criteria associated with unauthorized network traffic, and wherein the predefined criteria includes the unauthorized network traffic including confidential information not authorized for communication from the node;
    directing, by the firewall, the predetermined network traffic to the honeypot;
    analyzing the predetermined network traffic directed to the honeypot; and
    receiving, by the firewall, an update of the at least one rule based on the analysis of the predetermined network traffic directed to the honeypot.

14. A system, comprising:
    a honeypot; and
    a firewall in communication with the honeypot, the firewall including a processor and a memory and being configured to:
        identify predetermined network traffic originating from a node in one of a local area network and a virtual private network utilizing at least one rule for identifying the predetermined network traffic, wherein characteristics of the predefined network traffic match predefined criteria associated with unauthorized network traffic, and wherein the predefined criteria includes the unauthorized network traffic including confidential information not authorized for communication from the node;
        direct the predetermined network traffic to the honeypot; and
        receive an update of the at least one rule based on an analysis of the predetermined network traffic directed to the honeypot.

* * * * *